Feb. 13, 1968  W. H. LUSK  3,368,703
SILO AUGER ASSEMBLY OF THE SWEEP FRAME TYPE
Filed Feb. 21, 1966  3 Sheets-Sheet 1
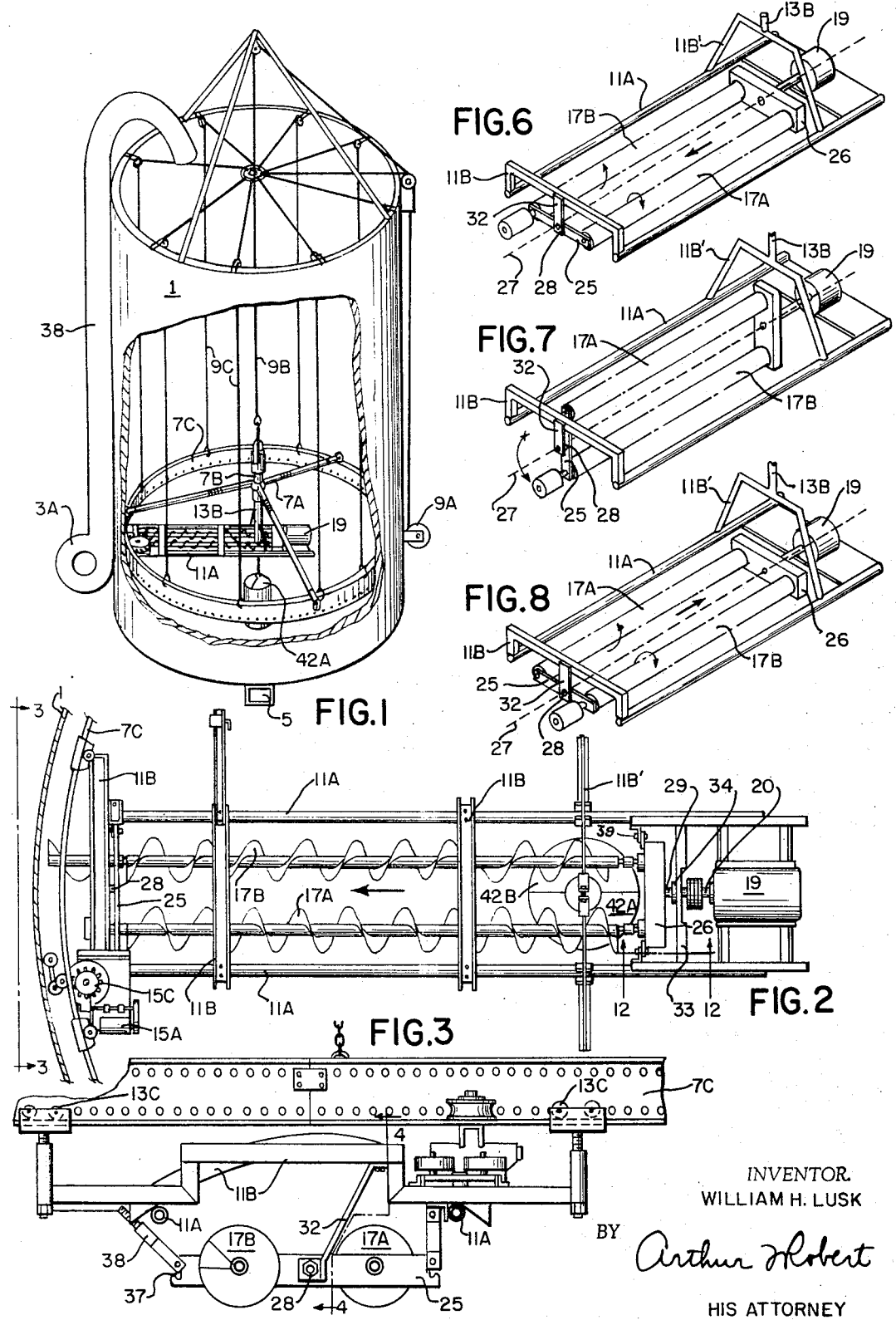
INVENTOR.
WILLIAM H. LUSK
BY Arthur H. Robert
HIS ATTORNEY Feb. 13, 1968  W. H. LUSK  3,368,703
SILO AUGER ASSEMBLY OF THE SWEEP FRAME TYPE
Filed Feb. 21, 1966  3 Sheets-Sheet 2
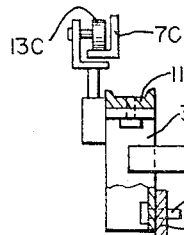
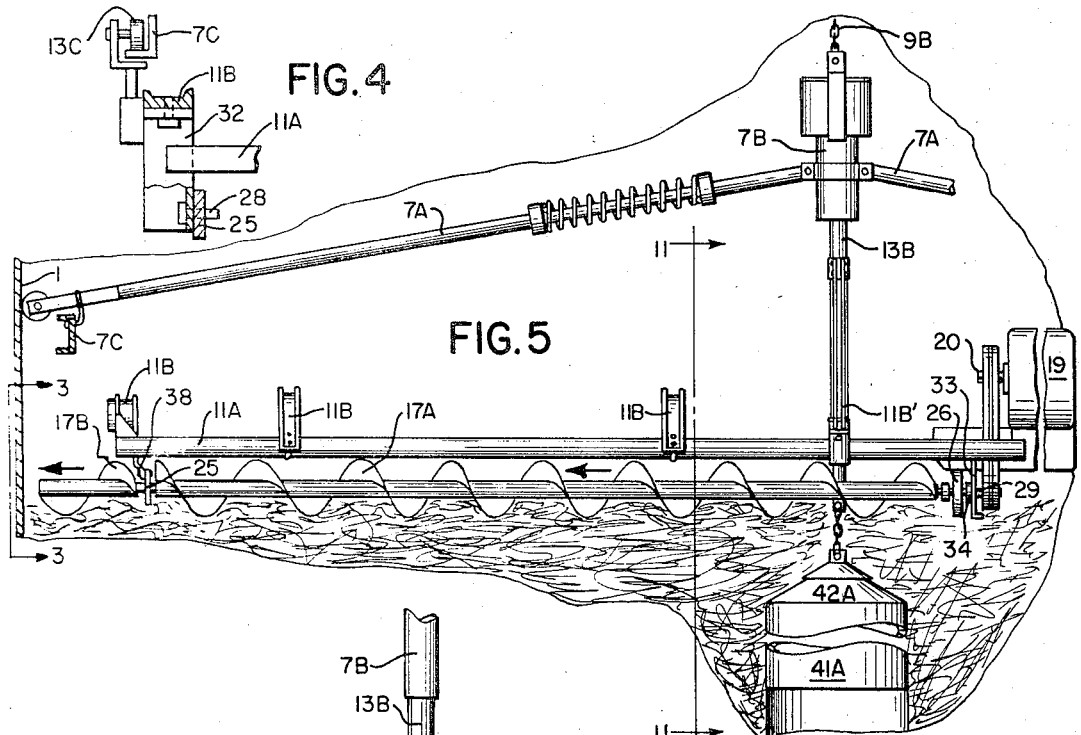
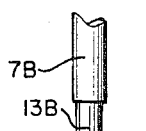
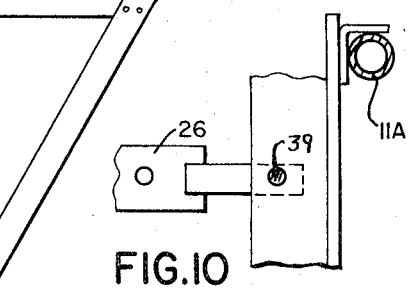
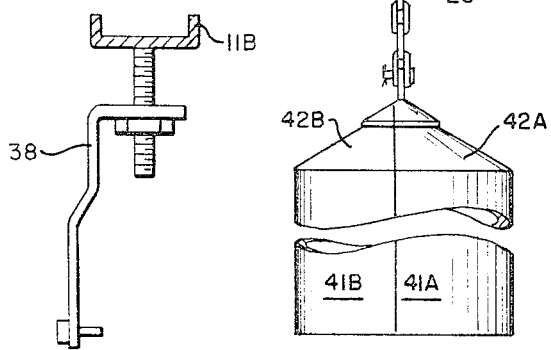
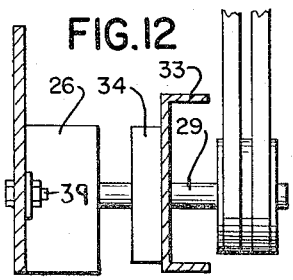
INVENTOR.
WILLIAM H. LUSK
BY
Arthur Robert
HIS ATTORNEY Feb. 13, 1968  W. H. LUSK  3,368,703
SILO AUGER ASSEMBLY OF THE SWEEP FRAME TYPE
Filed Feb. 21, 1966  3 Sheets-Sheet 3
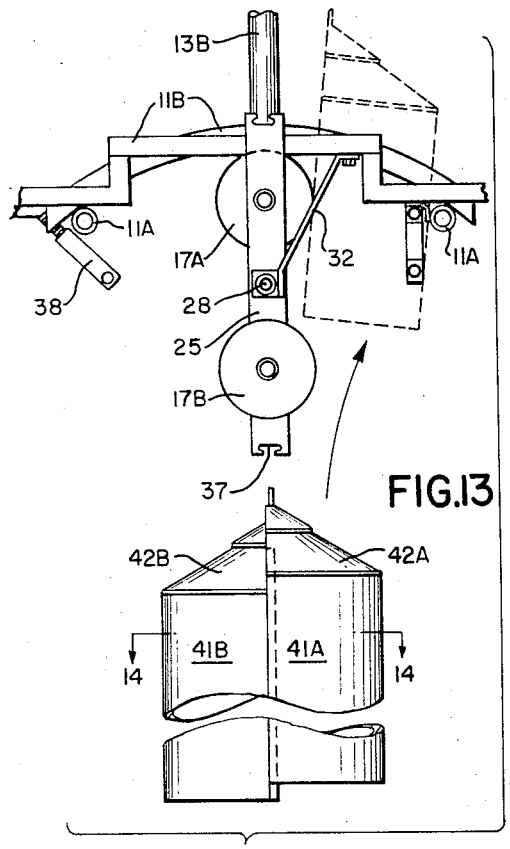
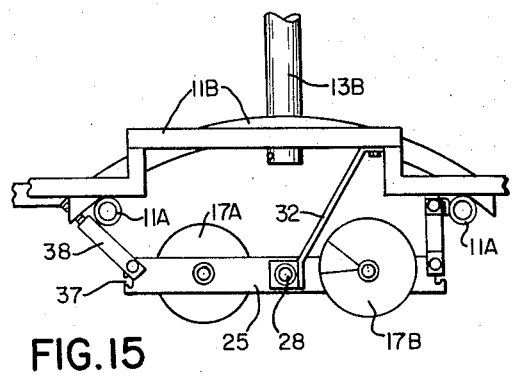
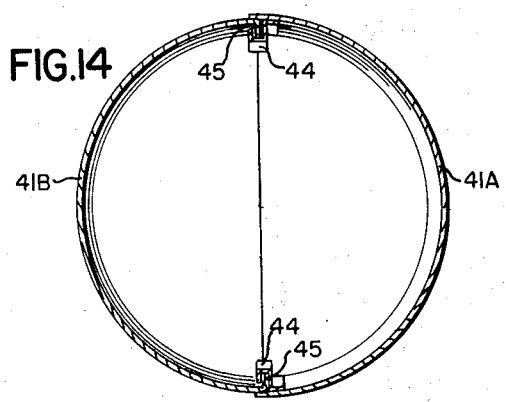
INVENTOR.
WILLIAM H. LUSK
BY
Arthur J. Robert
HIS ATTORNEY

United States Patent Office 3,368,703
Patented Feb. 13, 1968

3,368,703
SILO AUGER ASSEMBLY OF THE SWEEP
FRAME TYPE
William H. Lusk, Louisville, Ky., assignor to Clayton &
Lambert Manufacturing Company, Buckner, Ky., a corporation of Delaware
Filed Feb. 21, 1966, Ser. No. 528,840
15 Claims. (Cl. 214—17)

ABSTRACT OF THE DISCLOSURE

A silo auger assembly having (A) a radial sweep-frame motorized to rotate or sweep about a vertical sweep axis at its inner end, this axis corresponding to the vertical central axis of a silo; (B) a channel-former, which, during the silo filling operation, is supported at the inner end of the assembly to depend along the silo axis; and (C) a pair of radially-extending spaced parallel right and left hand augers (1) mounted on the sweep frame for constrained auger-interchanging movement (a) from a silage spreading position, in which the right hand auger is located on one side of the left hand auger, (b) to a silage unloading position, in which the right hand auger is located on the other side of the left hand auger, and (2) motorized to rotate the bottom side of both augers toward each other in both positions so that they always scrape silage into the space between them.

In the silage spreading position, the assembly operates to receive the incoming silage at its inner end, contemporaneously move it radially outward and rotationally so as to spread it uniformly about the channel-former, which functions progressively (as the filling operation proceeds) to form a silage discharge conduit extending upwardly through the center of the silage column and which is removed at the end of that operation. In the unloading position, the assembly operates to scrape silage from the top of the column and move it radially inward to the center of the silo where it falls through the silage discharge conduit.

CROSS REFERENCES TO RELATED APPLICATIONS

There is not any related application.

BACKGROUND OF THE INVENTION

Field of the invention

The present invention resides in the provision of improved means for mounting the auger means upon the sweep frame and to improvements in the construction of the channel former.

Description of the prior art

A typical double auger assembly, when located within a silo, may be conventionally described as comprising: (A) a horizontally elongate "sweep" frame having an outer end adjacent the wall of the silo and an inner end portion centered on the vertical axis of the silo for rotation about that axis in the fashion of the sweep-hand of a clock; (B) a pair of radially-extending transversely-spaced right and left hand augers having their opposite inner and outer ends journalled on the sweep frame; and (C) reversible motorized auger-drive means mounted on the sweep frame to rotate both augers. For convenience, the term "silo axis" is hereinafter used to designate the centrally-disposed vertical axis of the silo.

The auger assembly is prepared for the loading operation by providing it with a vertically-arranged cylindrical channel-former which is suspended underneath its inner end and centered upon the silo axis. During the process of loading an empty silo of the bottom unloading type, it is conventional practice to perform the following operations viz: (1) lower said double auger assembly downwardly through the silo until its channel former closes the bottom unloading opening thereof; (2) feed the incoming silage downwardly toward the bottom center of the silo; (3) rotate the individual augers of the assembly in opposite directions such that they move underlying silage not only into the space between augers but also outwardly along that space; and (4) simultaneously rotate the auger assembly as a whole in "sweep-hand" fashion about the silo axis so as to sweep the centrally-deposited outwardly-moving silage rotationally and thereby distribute it across the silo's interior to maintain the top of the silage column in a level condition as it builds up. As the loading operation proceeds, the auger assembly and the channel-former are raised from time to time until the column of silage has been built up to its final height with a built-in vertical discharge conduit along the silo axis.

To prepare the auger assembly for the unloading process, it is neccessary not only to remove the channel-former so as to open the upper end or mouth of the discharge conduit but also to reverse the direction of rotation of each auger so that they will move underlying silage radially inward toward the mouth of the built-in vertical discharge conduit through which it is free to fall along the silo axis to the bottom of the silo where it passes through the bottom opening thereof and into the bottom unloader. Furthermore, it is desirable to reverse the relative positions of the inwardly-feeding augers (i.e. to interchange them) so that both of them feed the underlying silage laterally into the space between augers as they move that silage inwardly along that space; otherwise, the inward feed will be extremely inefficient. This auger-interchanging operation requires the mounting means of each auger to be dismantled and reassembled respectively before and after they are interchanged. Consequently, the operation is both laborious and time-consuming, which is highly objectionable.

*"Auger mounting" invention objects*

For the sake of clarity, reference to the invention will hereinafter be largely confined to the highly preferred double auger type.

The principal object of the present invention is to effect a very substantial simplification of the interchange operation and thereby substantially reduce, if not eliminate, the objections to it.

Another important object is to provide a relatively simple double auger arangement which may be easily and quickly operated to reverse the relative positions of the augers.

*Summary of auger mounting invention*

The foregoing objects can be substantially achieved by mounting the opposite ends of the augers upon a pair of radially-spaced transversely-extending end frames to form an auger unit and by mounting that unit upon the sweep frame for angular auger-interchange movement between operative inward-feeding and outward-feeding positions which are spaced 180° apart.

*Channel former prior art*

The removal of the channel-former requires: the double auger assembly to be raised sufficiently to free the channel-former from the silage column; and the former to be disconnected from the assembly and removed for storage in an out-of-the-way position. This is objectionable not only because of the time and labor involved in disconnecting and removing the channel-former, which is bulky and heavy, but also because the necessity of raising the assembly to free the channel-former, limits the maximum height of the column and introduces additional objections should such limits be exceeded.

Channel former invention objects

Other important objects are to improve the channel former in a manner such that its removal requirements do not limit the height of the silage column. More particularly, other objects are to provide a channel-former which can be easily and quickly removed without specially raising the auger assembly and which can be easily and quickly returned to its operative position.

Channel former invention

The foregoing "channel-former" objects can be achieved by vertically-splitting the channel-former into two (or more) parti-cylindrical sections which can be separately removed upwardly through the sweep frame of my improved double auger assembly when the double auger unit is moved half-way between its operative feeding positions. Where a single auger assembly is used, the parti-cylindrical sections can be separately removed upwardly along the outer sides of the single auger.

Brief description of the drawing

The invention is illustrated in the accompanying drawings wherein:

FIG. 1 is a small-scaled somewhat schematic broken perspective view of a silo containing a double auger assembly made in accordance with the presently preferred form of my invention;

FIG. 2 is a larger-scaled top plan view of the double-auger assembly of FIG. 1, this view also showing a fragmentary portion of the silo wall in horizontal section;

FIG. 3 is an elevational view showing the outer end of the auger assembly, this view corresponding to one taken along line 3—3 of FIGS. 2 and 5 with the silo wall omitted;

FIG. 4 is an enlarged detail view showing how the outer end of the double-auger assembly is supported for rotation about the silo axis, this view corresponding to one taken along line 4—4 of FIG. 3;

FIG. 5 shows the double auger assembly of FIGS. 2 and 3 in side elevation but omits the outer end drive means for rotating the auger assembly about the silo axis;

FIGS. 6–8 are diagrammatic views showing how my auger assembly may be angularly moved for channel-former removal and auger-interchange purposes;

FIG. 9 is an enlarged detail view showing the adjustable keeper (for latching one outer corner of the double-auger unit when that unit is in either of its operative positions), as it appears in FIGS. 3, 13 and 15;

FIG. 10 is an enlarged detail view showing the latch means for latching one inner corner portion of the double auger unit when that unit is in either of its operative positions;

FIG. 11 is a vertical sectional view taken transversely through the inner mid-portion of the double-auger assembly along a line corresponding to 11—11 of FIG. 5;

FIG. 12 is a slightly enlarged detail view taken along a line corresponding to 12—12 of FIGS. 11 and 2 to show the inner end frame latching and trunnion mounting means;

FIG. 13 is an outer end elevational view showing the double-auger unit in its mid-way position to facilitate the removal of the channel former;

FIG. 14 is a horizontal section through the channel former corresponding to one taken along line 14—14 of FIG. 13; and FIG. 15 is an elevational view of the outer end of the double-auger unit upon the completion of the interchange operation.

CONVENTIONAL STRUCTURE

FIG. 1 illustrates a bottom unloading silo installation which includes: a conventional silo 1; conventional means for feeding incoming silage upwardly to the top of the silo and then discharging it downwardly toward the bottom center thereof, this means including a blower 3A for forcing the incoming silage through conduit 3B; conventional bottom unloading means (not shown) arranged underneath the bottom of the silo for receiving silage through a centrally-disposed bottom-opening, directing it laterally outward and discharging it wherever desired as through the unloader discharge opening 5; a conventional main frame which can be raised and lowered in the silo but not rotated and which is composed of a horizontally radiating spider frame 7A interconnecting a centrally-disposed vertically-arranged non-rotatable sleeve 7B (centered on the vertical axis of the silo) with a horizontal traction ring 7C extending circularly along the inner wall of the silo; and winch-actuated cable means for raising and lowering the main frame 7, this means including winch 9A, center cable 9B supporting sleeve 7B and a series of outer cables 9C supporting traction ring 7C.

The main frame 7A–C of the foregoing conventional structure supports a double auger assembly and a channel-former both of which are constructed in accordance with the present invention.

DOUBLE AUGER ASSEMBLY

A double auger assembly embodying my invention includes conventional structure and what may be called inventive structure. The conventional structure will be described first.

Conventional assembly structure

The double auger assembly is conventional to the extent that it broadly includes: (A) a horizontally-elongate "sweep" frame having an outer end adjacent the wall of the silo and an inner end portion centered for rotation about the silo axis in the fashion of the sweep-hand of a clock, this frame comprising radially-extending transversely-spaced elongate frame members 11A integrated with suitable cross-members 11B spaced along their length, including cross-member 11B′ which intersects the silo axis; (B) means mounting the sweep frame 11A–B upon the main frame 7A–C for sweep-hand rotation about the vertical silo axis, this mounting means including a vertically-arranged centrally-disposed stem 13B rotationally mounted along its upper end portion on the center sleeve 7B of the main frame and connected below that sleeve to support the inner end portion of the sweep frame 11A–B and also including vertically-arranged outer-end rollers 13C having gravitational rolling engagement with traction ring 7C and being connected to the outer end of sweep frame 11A–B to support that end from the traction ring 7C for movement therealong; (C) motorized means mounted on the outer end of the sweep frame for effecting its sweep-hand rotation, this means beginning with motor 15A and ending with motor-driven sprocket 15C, the teeth of which progressively engage the traction ring 7C at successive openings formed as an endless series in the traction ring 7C; (D) a pair of radially-extending transversely-spaced right and left hand augers 17A and 17B having their opposite inner and outer ends rotationally supported from the sweep frame; and (E) reversible motorized auger drive means mounted on the sweep frame to rotate both augers, this means including motor 19 mounted on the sweep frame to drive shaft 20.

Inventive structure

Heretofore the right and left hand augers 17A and 17B have had their opposite ends rotationally supported directly on the sweep frame 11A–B. In accordance with the present invention, the augers are incorporated in a double auger unit and that unit, as schematically indicated in FIGS. 6–8, is mounted on the sweep frame for angular movement, about a long axis centrally disposed between the augers, from its extreme operative outward-feeding position in FIG. 6, through 90°, to its midway position in FIG. 7 and through another 90°, to its inward-feeding position in FIG. 6 through 90°, to its midway position provided for latching the unit in each of its operative positions.

*Double auger unit.*—The double auger unit comprises: a pair of radially-spaced transversely-extending end frames including an outer end frame 25, having 1st and 2nd ends, and an inner end frame 26 in the form of a gear-box having corresponding 1st and 2nd ends; means journalling the opposite ends of auger 17A upon the 1st ends of the end frames 25 and 26 and the opposite ends of auger 17B upon the opposed 2nd ends of end frames 25 and 26, said augers being symmetrically spaced diametrically from each other about a common long axis 27 centrally disposed between them; a trunnion 28 located in the long axis 27 and centrally mounted to project axially from the outer face of the outer end frame 25; and another trunnion 29 located in the long axis 27 and rotationally mounted to project axially from the outer face of the inner gear-box end frame 26, this trunnion 29 also constituting the input shaft of the gear-box; hence being drivingly connected (through gears not shown in the gear box end frame 26) to the corresponding ends of the augers 17A and 17B.

*Auger unit mounting means.*—The means mounting the auger unit on the sweep frame, for angular movement about its common axis from one operative position to the other, comprises: an outer bracket 32 suspending the outer trunnion 28 of the unit rotationally upon the sweep frame; and an inner cross frame member 33 fixedly secured to the elongate frame members 11A of the sweep frame and arranged to carry a suitable bearing 34 in which the drive trunnion 29 is rotationally supported upon the sweep frame. It will be understood, of course, that the drive trunnion 29 is connected in any suitable manner to the drive shaft 20 of the reversible auger drive motor 19. A belt-pulley connection is shown in FIGS. 11 and 12.

*Double auger unit latching means.*—The outer end frame 25 and the inner end frame 26 may each be releasably latched to the sweep frame 11A, 11B in each of the operative positions of the unit. While the latching means obviously may be satisfactorily accomplished in any of a variety of well-known ways, each outer end face of the end frame 25 is provided with a T-shaped latching slot 37 which opens outwardly to receive one end of a latching bar or keeper 38, the other end of which is adjustably mounted on a rigid threaded stud carried by a cross member 11B of the sweep frame. The opposite ends of the gear-box end frame 26 may be releasably latched to the sweep frame through bolts 39 as indicated in FIGS. 2, 10 and 12.

CHANNEL-FORMER

The channel-former includes a cylinder 41 which is provided with a conical top 42. It is conventionally suspended by a centrally-disposed vertically-arranged cable or chain 43 which depends along the silo axis from the centrally-disposed-vertically-arranged stem 13B of the sweep frame mounting means. The chain 43 depends from the lower end of a removable pipe-like section of stem 13B.

In accordance with the second phase of my invention, the cylinder 41 and top 42 are vertically divided into parti-cylindrical sections which may be separately removed. As illustrated, it is divided into half sections comprising: semi-cylinders 41A and 41B; and corresponding semi-cones 42A and 42B. The A section of the former, which overlaps the B section, is mounted on the B section; hence the vertical end edges of semi-cylinder 41A are slidably connected to the corresponding end edges of 41B in a manner permitting the upward removal of 41A from 41B. While this may obviously be done in various ways, in the structure illustrated, it is done by providing each vertical margin on the inner face of the overlapping section 41A with a vertically-extending channel 44 opening outwardly to receive the adjacent inturned edge 45 of the section 41B.

OPERATION

In preparing the double auger assembly for the loading process, the "bottom" or B section of the channel former 41 is mounted on the assembly preferably by securing the upper end of the B section (the semi-cone 42B) through chain 43 to stem 13B. The double auger unit is latched in its outward-feed position shown in FIG. 6 while the auger drive motor 19 is electrically connected to rotate the individual augers 17A and 17B in the outward-feed direction. The loading process is then conventionally carried out.

At the end of the loading process, the auger assembly is prepared for the unloading process first by removing the channel former and second by completely reversing the auger unit.

In removing the channel former 41, it is disconnected from (the upper section of) stem 13B and then both ends of the auger unit are unlatched from the sweep frame whereupon the unit is rotated about 90° out of its outward-feed position of FIG. 6, to its vertical or midway position of FIG. 7. The removably mounted "top" (or A section) of the former may now be removed by pulling it upwardly through the elongate opening between one side of the auger unit and that elongate member 11A which is on the same side. Thereafter, the B section of the former is removed by pulling it upwardly through the elongate opening adjacent the other side of the auger unit.

The complete reversal of the auger unit is accomplished by rotating it about 90° (out of its vertical mid-way position of FIG. 7) to its horizontal inward-feed position of FIG. 8) and by reversing the auger drive motor 19 to reverse the direction of auger rotation from the outward-feed direction to the inward-feed direction. Now, when the auger unit is re-latched to hold it in its inward-feed position, the unloading process can be conventionally performed.

Scope of auger mounting invention

While the invention has been illustrated and described as applied to an auger assembly or spreader-unloader of the sweep-frame double auger type, i.e. one using a pair of augers, it broadly applies to an auger assembly of the sweep-frame auger-means type, i.e. one having a pair of elongate members, at least one of which is an auger. Accordingly, it resides in means for mounting said elongate auger member and said other elongate member on said sweep-frame to extend horizontally in transversely-spaced side-by-side relationship wherein said means includes (1) means mounting one of said elongate members for movement relative to the other of said elongate members (a) from one operative position, in which both elongate members extend from the vicinity of said sweep axis horizontally outward with said one elongate member on one side of said other elongate member, (b) to another operative position, in which both elongate members extend from the vicinity of said sweep axis horizontally outward with said other elongate member on the other side of said one elongate member.

Having described my invention, I claim:
1. A double auger unit for use in a silo auger assembly of the sweep-frame double-auger type positionable within a vertically-extending silo to sweep around the vertical central axis of the silo in clock-hand fashion while its augers move ensilage radially along the top surface of a column in the silo, comprising:

(A) a pair of radially-spaced transversely-extending end frames;
(B) a pair of radially-extending transversely-spaced augers having their opposite ends mounted on and journalled in said end frames; and
(C) means on each end frame for mounting said augers on a sweep frame for angular movement about a common long axis between said augers from a 1st position to a 2nd position spaced approximately 180° from the 1st so as to reverse the relative positions of said augers.

2. A silo auger assembly of the sweep-frame double-auger type positionable within a vertically-extending silo to sweep around the vertical central axis of the silo in clock-hand fashion while its augers move ensilage radially along the top surface of a column in the silo, comprising:
(A) a sweep frame; and
(B) a double auger unit including
   (1) a pair of radially-spaced transversely-extending end frames,
   (2) a pair of radially-extending transversely-spaced augers having their opposite ends mounted on and journalled in said end frames, and
   (3) means on each end frame for mounting said augers on said sweep frame for angular movement relative to said sweep frame about a common long axis between said augers from a 1st position to a 2nd position spaced approximately 180° from the 1st so as to reverse the relative positions of said augers.

3. The assembly of claim 2 wherein:
(A) said mounting means includes, between one end frame part and said sweep frame part,
   (1) a trunnion on one part, and
   (2) means on the other part for rotatably receiving said trunnion.

4. The auger assembly of claim 2 wherein:
(A) said augers are right and left hand augers; and
(B) reversible drive means for rotating both augers,
   (1) in said 1st position, in opposite directions such that each auger tends to move underlying silage into the space between augers and radially outward along that space, and,
   (2) in said second position, in reversed directions such that each auger tends to move underlying silage into the space between augers and radially inward along that space.

5. The auger assembly of claim 4 wherein:
(A) said reversible drive means includes
   (1) on one of said end frames,
      (a) an input shaft centrally disposed to project radially in a direction proceeding away from the space between augers, and
      (b) a power transmitting connection between the inner end of said input shaft and the adjacent end of each of said journalled augers, and
   (2) reversible means for driving said input shaft in either direction at will.

6. The auger assembly of claim 5 wherein:
(A) said mounting means includes
   (1) at one end of said unit, said input shaft and means on the sweep frame for rotatably receiving and supporting said input shaft, and
   (2) at the opposite end of said unit, between the corresponding end frame part and said sweep frame,
      (a) a trunnion on one part, and
      (b) means on the other part for rotatably receiving and supporting said trunnion.

7. The auger assembly of claim 2 including:

(A) means for releasably latching said auger unit to the sweep frame in each of said positions.

8. The auger assembly of claim 2 in combination with:
(A) a channel-former of the type intended to be suspended from said assembly during a silo loading operation, with its vertical axis substantially in alignment with the vertically-extending center axis of the purpose of creating an outlet conduit extending upwardly through the silage as the loading operation progresses, said member including
   (1) a cylindrical channel-forming member composed of separable sections, and
   (2) means for securing said sections together in a manner permitting them to be removed separately; and
(B) means for removably suspending said former from said assembly in said alignment.

9. The auger assembly of claim 2 in combination with:
(A) a vertically-arranged cylindrical channel-former removably suspended from said assembly with its vertically-extending center axis in substantial alignment with the vertically-extending center axis of the silo,
   (1) said channel former being split vertically into parti-cylindrical sections including
      (a) a main section, and
      (b) another section removably secured to the main section for upward removal therefrom in endwise fashion.

10. A channel former of the type intended to be suspended from a silo auger assembly during a silo loading operation for the purpose of creating an outlet conduit extending upwardly through the silage as the unloading operation proceeds, comprising:
(A) a cylindrical channel-forming member split along its length into at least two parti-cylindrical sections; and
(B) means for securing said sections together in a manner permitting the separate end-wise upward removal of one part from another.

11. A spreader-unloader of the sweep-frame auger-means type positionable within a vertically-extending silo to sweep around the vertical central axis of the silo in clock-hand fashion while its auger means moves ensilage radially along the top surface of a silage column in the silo, comprising:
(A) a sweep-frame having a vertical sweep axis corresponding to the vertical central axis of a silo;
(B) a pair of elongate members, at least one of said members being an auger; and
(C) means mounting said elongate members on said sweep-frame to extend horizontally in transversely-spaced side-by-side relationship, said means including
   (1) means mounting one of said elongate members for movement relative to the other of said elongate members
      (a) from one operative position, in which both elongate members extend from the vicinity of said sweep axis horizontally outward with said one elongate member on one side of said other elongate member,
      (b) to another operative position, in which both members extend from the vicinity of said sweep axis horizontally outward with said one member on the other side of said other member.

12. A spreader-unloader of the sweep-frame auger-means type positionable within a vertically-extending silo to sweep around the vertical central axis of the silo in clock-hand fashion while its auger means moves ensilage radially along the top surface of a silage column in the silo, comprising:
(A) an auger means including
   (1) frame means and (2) a pair of elongate members mounted on said frame means to form an integrated unit with said members extending horizontally in transversely-spaced side-by-side relationship,
    (a) one of said elongate members comprising an auger;

(B) a sweep-frame having a vertical sweep axis corresponding to the vertical central axis of a silo; and (C) means mounting said integrated auger-means unit upon said sweep-frame for member-interchange movement in which both members and said unit move relative to said sweep-frame,
    (1) said auger-means unit moving
        (a) from one operative position, in which both members extend from the vicinity of said sweep axis horizontally outward with the auger member on one side and the other member on the other side of the space between them,
        (b) to another operative position, in which both members extend from the vicinity of said sweep axis horizontally outward with the members interchanged so that the auger member is on said other side and the other member is on said one side of the space between them.

13. The spreader-unloader of claim 12, including:

(A) motorized means for rotating said auger member in each position in a direction such that its bottom side moves rotationally toward the other member,
    (1) said auger member being operative,
        (a) when so rotated in one of said positions with its bottom side in engagement with the top of a silage column, to scrape silage into the space between said members and to move that silage toward said sweep frame axis, and
        (b) when so rotated in the other of said positions with its inner end receiving incoming silage, to move that silage outwardly away from said sweep frame axis.

14. The spreader-unloader of claim 12, wherein:

(A) said pair of elongate members comprises a pair of right and left hand augers.

15. The spreader-unloader of claim 14 including:

(A) motorized means for rotating said auger members in each position in a direction such that the bottom side of each auger member moves rotationally toward the other auger member,
    (1) said auger members being operative,
        (a) when so rotated in one of said positions with their bottom sides in engagement with the top of a silage column, to scrape silage into the space between them, and to move that silage toward said sweep frame axis, and
        (b) when so rotated in the other of said positions with their inner ends receiving incoming silage, to move that silage away from said sweep frame axis.

References Cited

UNITED STATES PATENTS

| | | | |
|---|---|---|---|
| 3,075,657 | 1/1963 | Hazen | 214—17 |
| 3,297,177 | 1/1967 | Zeiter | 214—17 |

ROBERT G. SHERIDAN, *Primary Examiner.*